P. B. GILES.
MECHANISM FOR CROSS CUTTING AND RIPPING LOGS.
APPLICATION FILED JAN. 2, 1920.
1,370,887.
Patented Mar. 8, 1921.
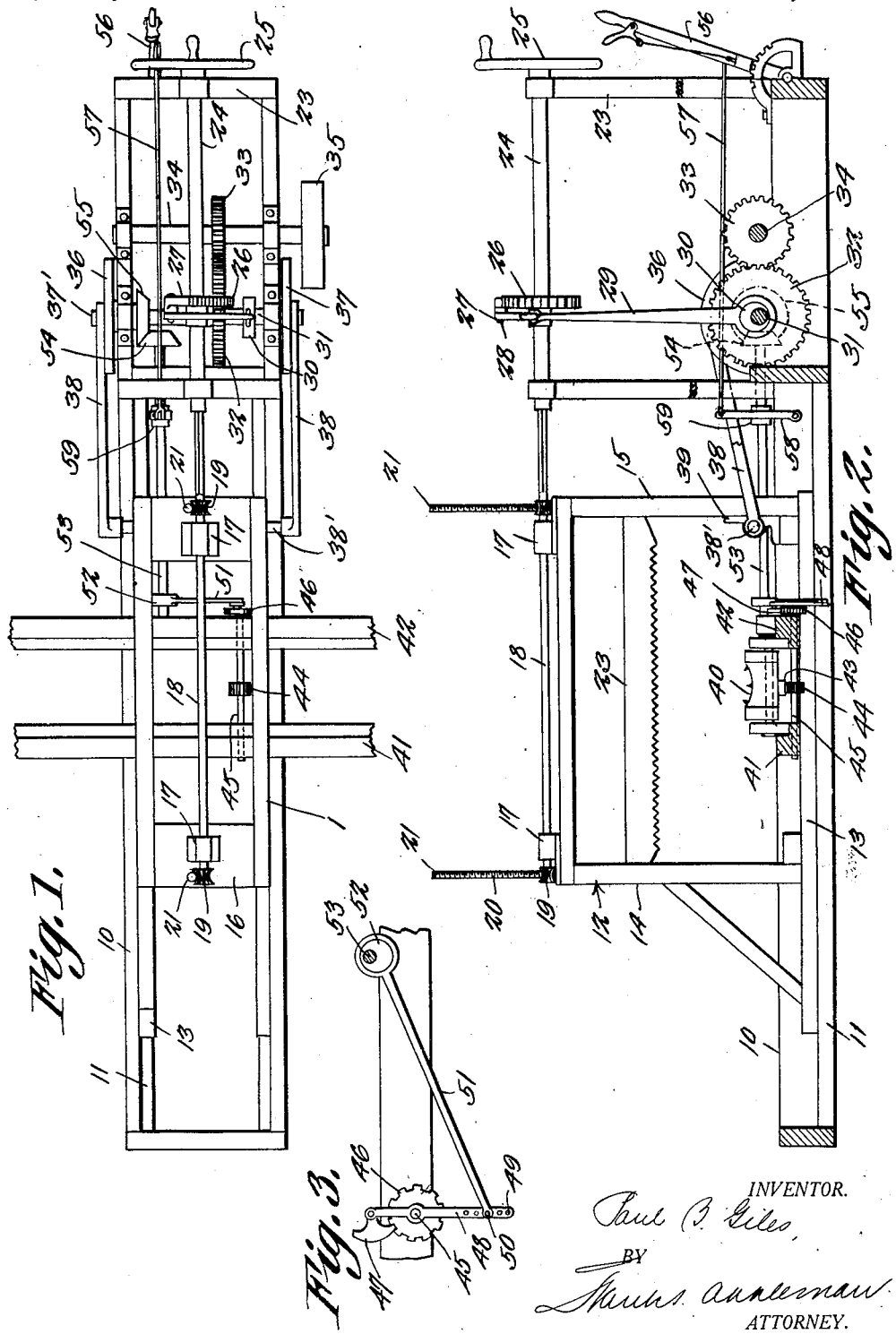
INVENTOR.
Paul B. Giles,
BY
ATTORNEY.

UNITED STATES PATENT OFFICE.

PAUL B. GILES, OF HYSHAM, MONTANA, ASSIGNOR OF ONE-HALF TO ADOLPH HERMAN HILLER, OF SUMATRA, MONTANA, AND ONE-HALF TO LUCILE GILES, OF HYSHAM, MONTANA.

MECHANISM FOR CROSS-CUTTING AND RIPPING LOGS.

1,370,887.      Specification of Letters Patent.      Patented Mar. 8, 1921.

Application filed January 2, 1920. Serial No. 348,793.

*To all whom it may concern:*

Be it known that I, PAUL B. GILES, a citizen of the United States of America, and a resident of Hysham, in the county of Treasure and State of Montana, have invented certain new and useful Improvements in Mechanism for Cross-Cutting and Ripping Logs, of which the following is a specification.

This invention relates to sawing and particularly to a mechanism for cross-cutting and ripping logs, the said invention having for its object the provision of novel means whereby a carrier of a log may be intermittently moved with respect to a saw and whereby the saw may be intermittently moved as a feed while cross-cutting a log so that the same machine will operate in the dual capacity of cross cutting logs into appropriate lengths and for cutting the log longitudinally to produce boards of desired thickness.

A still further object of this invention is to provide novel means for effecting the step by step movement of the log carrying member and furthermore, novel means for causing a step by step movement of the saw during the cross cutting operation; the foregoing elements being associated with power-driven means which is also effective as a means for reciprocating the saw carrier.

A still further object of this invention is to provide means associated with the log carrier whereby the same may be moved independently of the driven mechanism heretofore mentioned so that the log carrier may be moved by hand to bring it into proper position with relation to the saw for cross cutting.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 is a plan view of the sawing machine embodying the invention.

Fig. 2, is a sectional view thereof.

Fig. 3, a detailed view of the log carrying feed or actuator.

In these drawings, 10 denotes a rectangular sill or frame having tracks 11 on the inner surfaces of the sides of the sill, which constitute tracks for the saw carrying frame 12.

The saw carrying frame has members 13 which travel on the tracks and each of the members has uprights 14 and 15 connected to it, and the uprights of one member 13 are connected with those of the other member by a plate such as 16.

The plates 16 constitute supports for the bearings 17, in which a shaft 18 is journaled, and the said shaft carries the toothed wheels 19 which engage threads 20 on the rods 21, which rods are slidable through the plates and have their lower ends connected to heads 22, one of which is applied to each end of the saw 23. The heads 22 are of such shape that they may be attached to the lower ends of the rods 21 so that the saw may stand vertically or may lie horizontally.

The rectangular frame 10 also constitutes a support for a post 23ª in which a hollow shaft 24 is journaled, and the shaft 18 is splined in the shaft 24 so that it may slide therein but take rotary motion therefrom, and the said hollow shaft has a hand wheel 25 by which the said hollow shaft may be rotated under certain conditions, although the said hollow shaft is also mechanically rotated by means of the ratchet wheel 26 fastened to it and engaged by a dog 27 which dog is oscillatably mounted on a pin 28 so as to be raised and lowered by the pitman 29, which is driven by the eccentric 30 on the shaft 31; the said shaft 31 being suitably journaled in the frame. A gear wheel 32 is secured to the shaft 31 and is in mesh with a gear wheel 33 on the shaft 34. A pulley 35 is also mounted on the shaft 34 and may be driven from any suitable source of power (not shown). Disks 36 and 37 are rotated by the shaft 31, the said disks being secured on the shaft, and the said disks each has a wrist pin 37' on which a pitman 38 is mounted, and the ends of the pitmen which are remote from the disks are connected to a rod 38' carried by the brackets 39 of the saw frame, so that as the disks 36 rotate, the saw frame is reciprocated.

The heads 22 are slidable between the pairs of uprights 14 and 15 so that the saw is adjusted vertically with relation to a log which may be supported on the log carriage 40, operating on the rails 41 and 42. Any suitable means may be provided for clamping the log on the carriage, and the under surface of the carriage has a rack 43 engaged by a pinion 44 on the shaft 45, so that by rotating the shaft 45, the log carriage is moved longitudinally of the track. The shaft 45 is journaled in the rails and at one end the shaft has a ratchet wheel 46 engaged by a ratchet 47, carried by the lever 48, which is oscillatably mounted on the said shaft 45. The lever 48 has an adjustable connection through the medium of the apertures 49 and the pin 50 with an eccentric rod 51, and the said eccentric rod is mounted on the eccentric 52 on the shaft 53, said shaft 53 extending transversely of the track and having a driving member such as a beveled wheel 54 mounted on it, the said member 54 coacting with a driven member 55 on the shaft 31, so that through these instrumentalities, the log carrier may be moved. Provision is made, however, for disconnecting the means for moving the log carrier from the driven member 55 through the means of the lever 56, to which a link 57 is connected, the said link 57 being attached to the lever 58 having the function of engaging the collar 59 on the shaft 53 for moving the said shaft longitudinally to disconnect the member 54 from the driven member 55.

When a log is to be cut transversely by the mechanism, the means for moving the log carrier will be disconnected and the log carrier will be moved manually, and when the log has been brought into proper position with relation to the saw, the sawing mechanism will be driven to reciprocate the saw and at the same time feed it downwardly through the log by means of the rotatable shaft 18, the toothed wheels 19 and the threaded rods 20.

When a log is to be sawed longitudinally, however, the heads of the saw would be adjusted to hold the saw horizontally and the hollow shaft 24 will be rotated to move the saw vertically with relation to the end of the log, so that a proper cut will be made when the saw is moved. When this adjustment has been attained, the dog 27 would be held out of engagement with the ratchet wheel to obviate movement of the saw vertically and the mechanism will be started so that the saw will be reciprocated and the log carrier will be moved longitudinally under the saw and of course the means for driving the log carriage will be set so that it will be driven from the shaft 31. Then as the saw is operated, the log will be fed into engagement with the saw until the saw has cut the full length of the log. When this result has been attained, the heads of the saw will be adjusted to reverse the position of the teeth of the saw, the dog 47 will be thrown over to the side of the lever opposite that shown in Fig. 3; the hollow shaft 24 will be rotated to lower the saw a predetermined degree, according to the thickness of the board to be cut, and thereafter the sawing mechanism will be driven to move the log in the opposite direction against the teeth of the oppositely set saw, and thus a sawing operation would be accomplished with the to and fro movement of the log carrier or carriage. It will be observed the term "log carrier" and "log carriage" have been used alternatively, and where such is done, it is to be understood that the element 40 is referred to thereby. Many of the elements of this device are somewhat conventionally shown, but when so shown it is to be understood that mechanical devices of known constructions are to be employed in these connections, and that the details of such devices are not relied upon for novelty. For instance, the manner of splining the shaft 53 so that the member 54 can be moved into and out of engagement with the member 55 is well within the skill of an ordinary mechanic, and certainly within the knowledge of one skilled in the art, and therefore detail illustration of these parts is omitted.

I claim:—

1. In a sawing machine, a base frame, a power driven shaft journaled therein, a saw carrier mounted to reciprocate on the base frame, means for communicating the motion of the power driven shaft to the saw carrier, threaded rods slidable vertically with relation to the saw carrier, a shaft journaled in operative relation to the rods and having toothed wheels engaging the threads for elevating and lowering the rods, cross heads guided in the saw carrier and connected to the rods and taking motion therefrom, saw holders adjustably connected to the cross heads for holding the saw vertically or horizontally, a hollow shaft in which the shaft carried by the saw carrier is splined, a ratchet wheel on the said hollow shaft, a ratchet mounted to operate in connection with the ratchet wheel for rotating the hollow shaft in either direction, and means for communicating motion of the power driven shaft to the ratchet for intermittently moving the ratchet wheel.

2. In a sawing machine, a base frame, a power driven shaft journaled therein, a saw carrier mounted to reciprocate on the base frame, means for communicating the motion of the power driven shaft to the saw carrier, threaded rods slidable vertically with relation to the saw carrier, a shaft journaled in operative relation to the rods and having toothed wheels engaging the threads for elevating and lowering the rods, cross heads guided in the saw carrier and connected to the rods and taking motion therefrom, saw holders adjustably connected to the cross heads for holding the saw vertically or horizontally, and means for rotating the shaft having the toothed wheels.

PAUL B. GILES.